(12) United States Patent
Williamson et al.

(10) Patent No.: US 7,108,325 B2
(45) Date of Patent: Sep. 19, 2006

(54) MOVABLE SEAT WITH TAPERED SWIVEL ASSEMBLY AND CABLE TRACK WHEEL

(75) Inventors: John Williamson, Davie, FL (US); Kurt Anglese, Miami, FL (US); Sreekanth Chintapudi, Weston, FL (US); Pedro Meneses, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/962,112

(22) Filed: Oct. 8, 2004

(65) Prior Publication Data

US 2006/0108848 A1    May 25, 2006

(51) Int. Cl.
*B60N 2/14* (2006.01)
(52) U.S. Cl. .............................. 297/344.24; 297/344.22
(58) Field of Classification Search ........... 297/344.24, 297/344.26, 344.1, 344.22; 248/425, 349.1
See application file for complete search history.

(56) References Cited

U.S. PATENT DOCUMENTS

| | | | | |
|---|---|---|---|---|
| 4,226,398 A | * | 10/1980 | Freber | ........................ 248/415 |
| 5,161,765 A | * | 11/1992 | Wilson | ........................ 248/425 |
| 5,568,960 A | | 10/1996 | Oleson et al. | |

* cited by examiner

*Primary Examiner*—Milton Nelson, Jr.
(74) *Attorney, Agent, or Firm*—Gardner Carton & Douglas, LLP

(57) ABSTRACT

A moveable seat comprising a seat frame assembly and a tapered swivel assembly, the tapered swivel assembly having components that are laterally immobile with respect to each other, despite forces from the seat frame assembly upon the tapered swivel assembly. A cable tracking wheel capable of controlling all movement of the moveable seat is also disclosed.

20 Claims, 19 Drawing Sheets

MOVABLE SEAT WITH TAPERED SWIVEL ASSEMBLY AND CABLE TRACK WHEEL

FIELD OF THE INVENTION

The invention relates to movably mounted seats that can be adjusted in multiple directions. More particularly, the present invention relates to a moveable seat having a tapered swivel assembly and a cable tracking wheel, which enables the seat to pivot and articulate in multiple directions.

BACKGROUND OF THE INVENTION

Moveable seats are used in many vehicles (e.g., cars, trucks, and airplanes) and require stability, strength and durability in order to ensure the comfort and safety of travelers. In this regard, moveable seats must have a design that enables occupants to safely change configurations and/or orientations of the seat with minimal exertion while engaging in other tasks. This is of particular importance to business travelers who tend to travel often and for extended periods and tend to have to carry out business tasks while traveling and while occupying the seat.

Most conventional seats have base assemblies that allow movement in a limited number of directions, e.g., in a single plane, such as back and forth, side-to-side, or rotational. Moreover, while some conventional seats have base assemblies that allow for movement in all directions (i.e., omni-directional), these seats typically require separate controls for each direction of movement and/or they lack swivel pedestals with components that can maintain an optimal configuration throughout use of the movable seat. U.S. Pat. No. 5,161,765, for example, the entire content of which is incorporated by reference herein, discloses a seat having a control disk that is operably-connected to cables controlling lateral and rotational movement of the seat, and a rotatable flat disk supported atop ball bearings atop a second flat bottom disk. Because normal changes of a moveable seat's configuration and/or orientation naturally results in changing forces upon the swivel assembly or pedestal of the seat, conventional seats typically have swivel pedestals with components that tend to shift laterally from their intended axis of rotation. This shifting causes extraneous side-to-side movement amongst the components of conventional tapered swivel assemblies. Traditional efforts to correct for this lateral shifting of components of swivel assemblies, e.g., through use of high molecular weight polyethylene, are costly and imprecise.

Accordingly, there is a need for a moveable seat, the configuration and orientation of which can be easily, efficiently, and safely changed by an occupant of the seat, through use of a single lever mechanism within reach of the occupant, without sacrificing performance and/or stability of the seat, based on the forces resulting from the change in configuration and/or orientation of the seat. The present invention provides such a moveable seat.

BRIEF SUMMARY OF THE INVENTION

In an embodiment, the invention provides a moveable seat comprising a seat frame assembly and a tapered swivel assembly, the tapered assembly having components that are laterally immobile with respect to each other, despite forces from the seat frame assembly upon the tapered swivel assembly.

In another embodiment, the invention provides a moveable seat, comprising: a seat frame assembly, a tracking assembly, comprising moveable parts that move the seat frame assembly, a cable tracking wheel capable of controlling all movement of the tracking assembly, and a tapered swivel bearing having components that are laterally immobile with respect to each other, despite forces from the seat frame assembly upon the tapered swivel assembly.

BRIEF DESCRIPTION OF THE DRAWINGS

These and other advantages and novel features of the invention will be more readily appreciated from the following detailed description when read in conjunction with the accompanying drawings, in which.

DETAILED DESCRIPTION OF THE INVENTION

Figure 1:
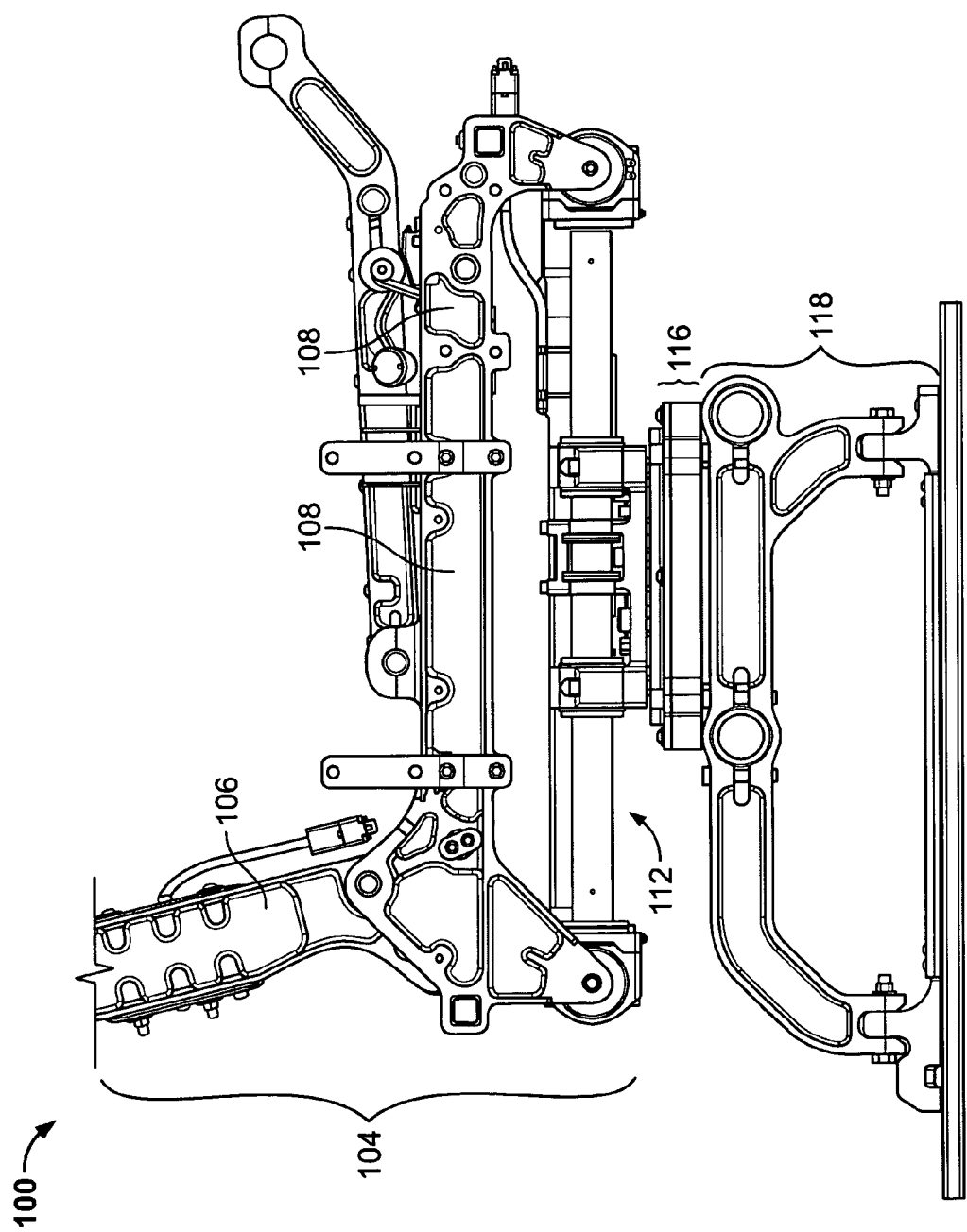
FIG. 1 is a side view of a seat assembly according to an embodiment of the present invention.
Figure 6:
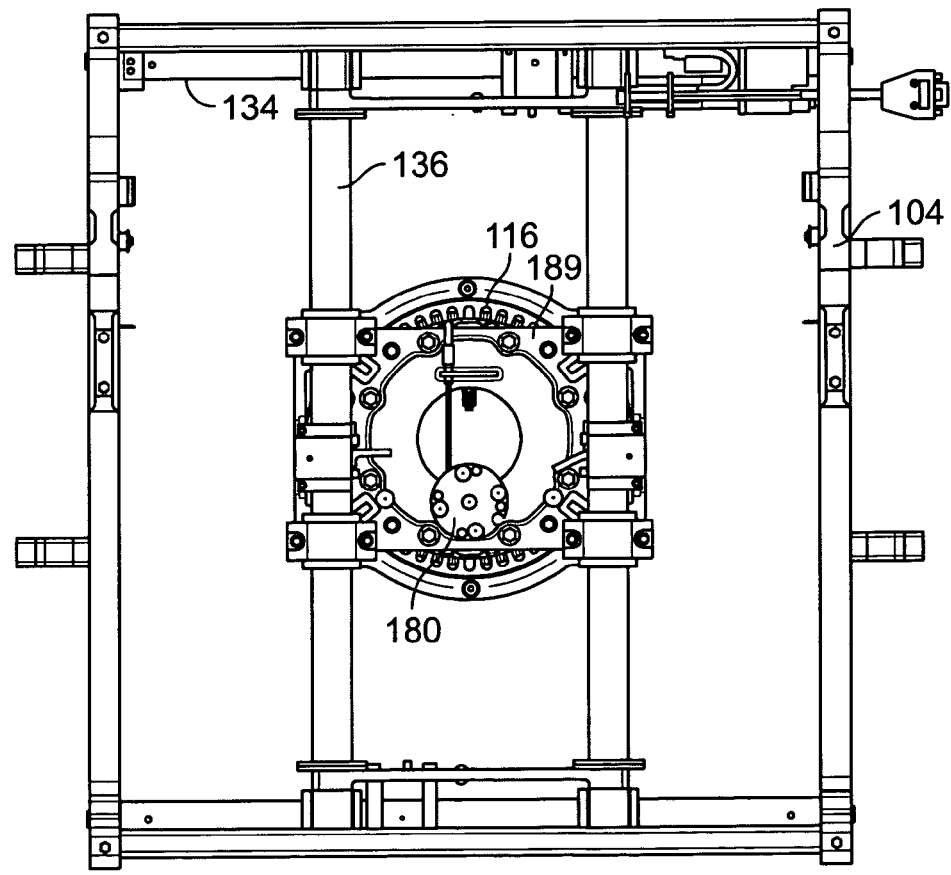
FIG. 6 is a top view of a seat frame assembly, a tracking assembly with a cable tracking wheel, and a tapered swivel assembly.

FIG. 1 is a schematic side view of a seat assembly 100, employing a tapered swivel assembly 116 and a cable tracking wheel 180 (not shown in FIG. 1), according to an embodiment of the present invention. As illustrated, the seat assembly 100 includes a seat frame assembly 104 having an upright portion 106 and a horizontal portion 108. Moreover, the seating assembly 100 includes a tracking assembly 112 which includes the cable tracking wheel 180 (see FIGS. 6–8), a tapered swivel assembly 116, and a leg base assembly 118 that is mountable to a surface, such as the floor of a dwelling, the floor of a passenger vehicle, or the floor of an aircraft.

Figure 2:
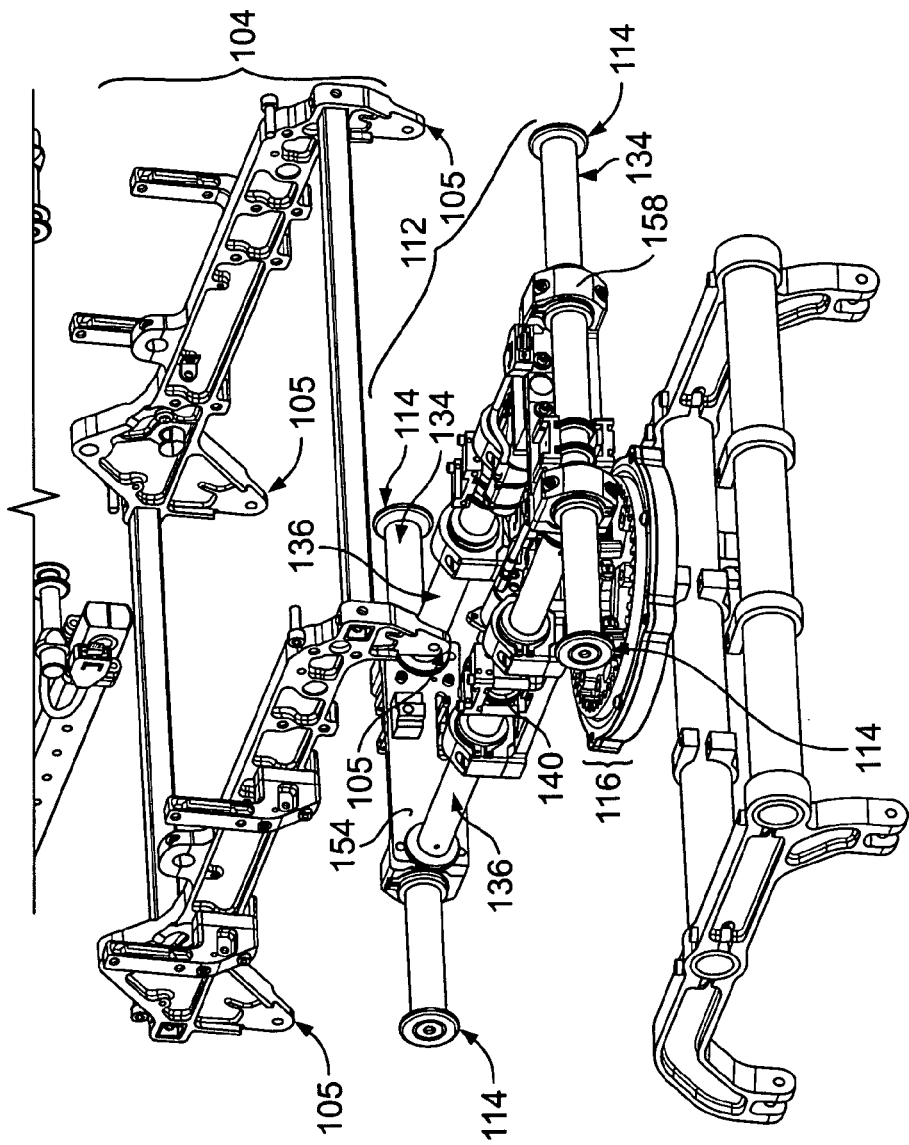
FIG. 2 is an exploded front view of the seat assembly shown in FIG. 1.
Figure 3:
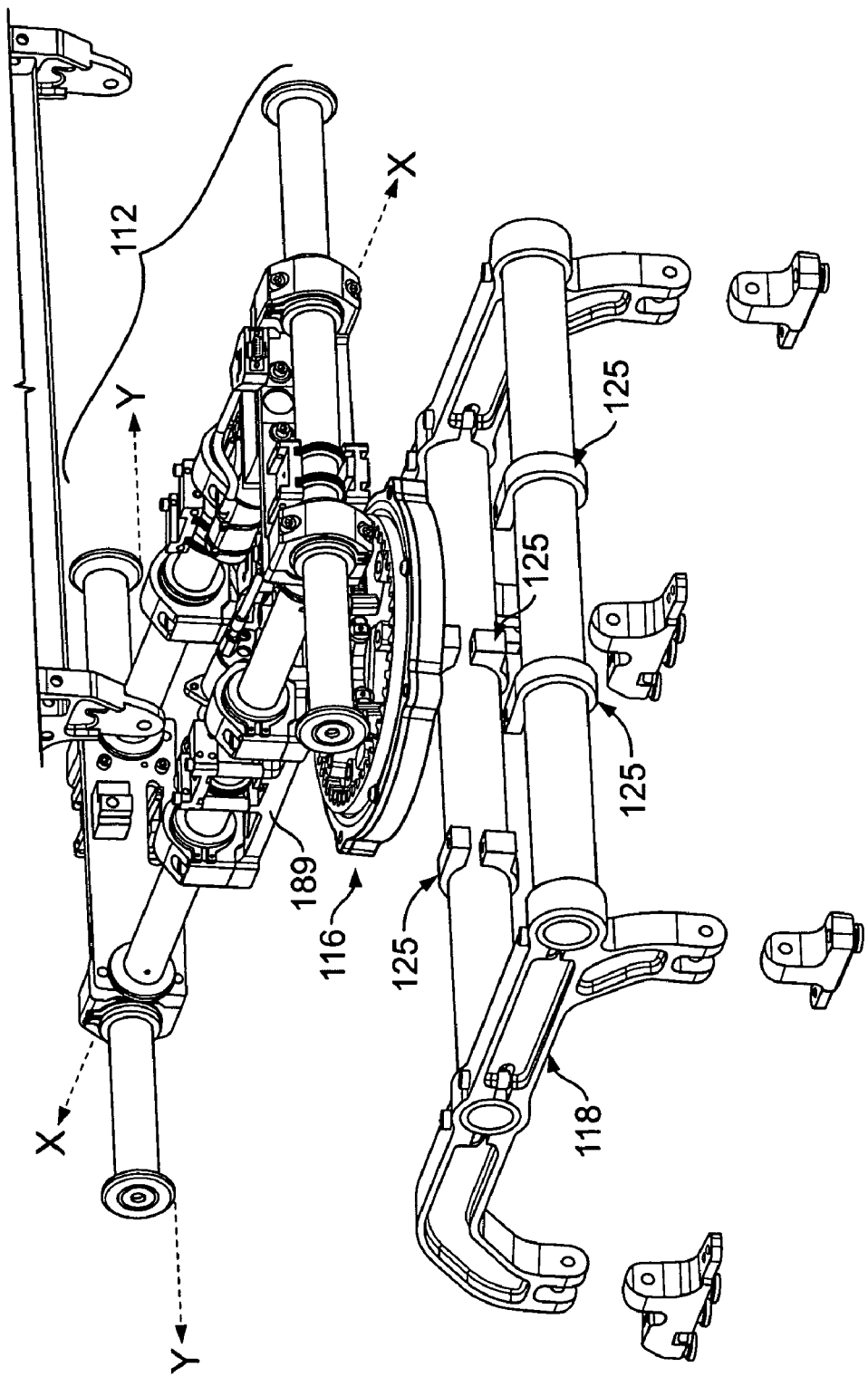
FIG. 3 is an exploded side view of the seat assembly shown in FIG. 1.
Figure 4:
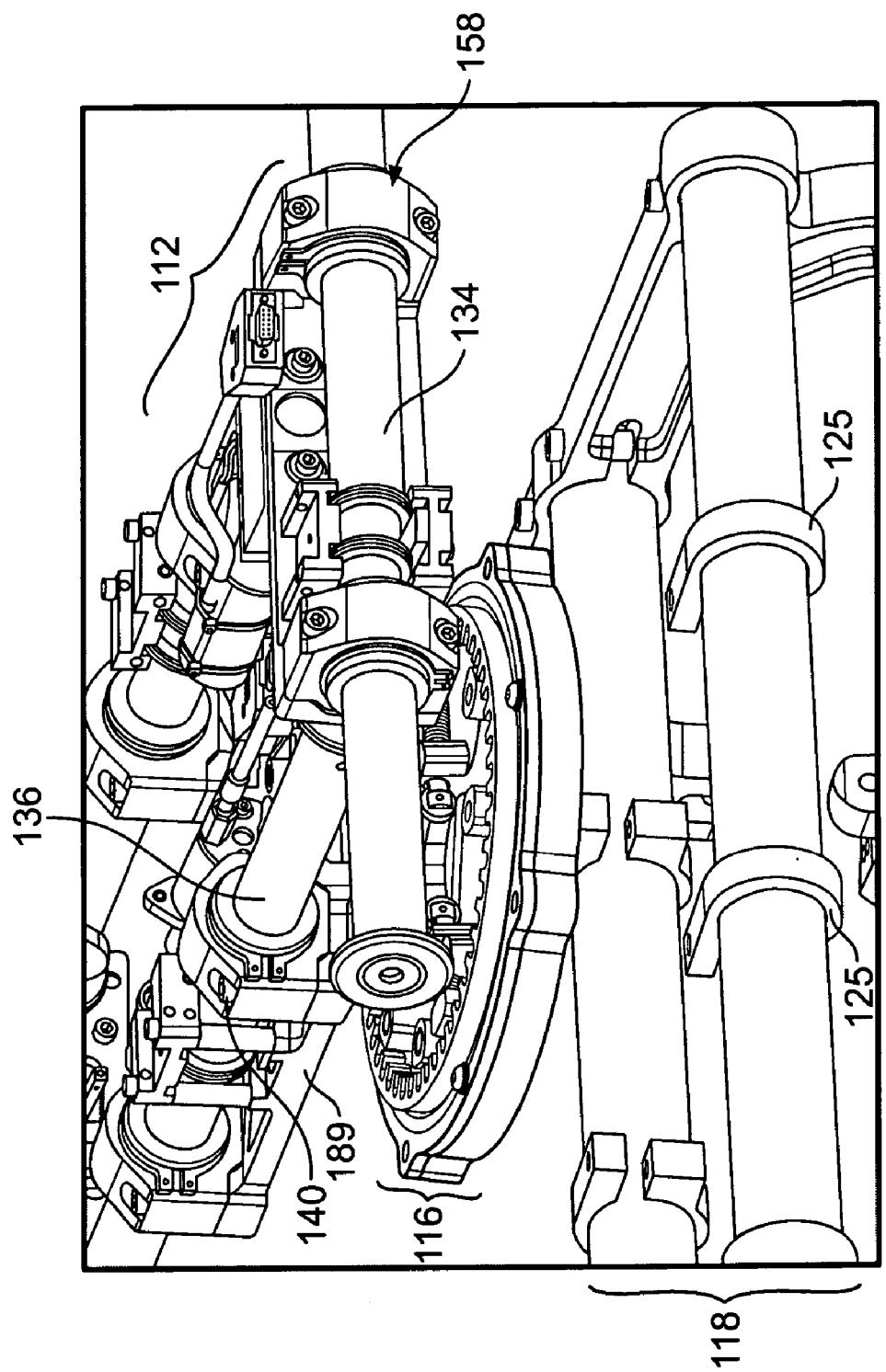
FIG. 4 is a front perspective view of a tracking assembly as connected to a tapered swivel assembly and separate from a leg base assembly of the seat assembly shown in FIG. 1.
Figure 5:
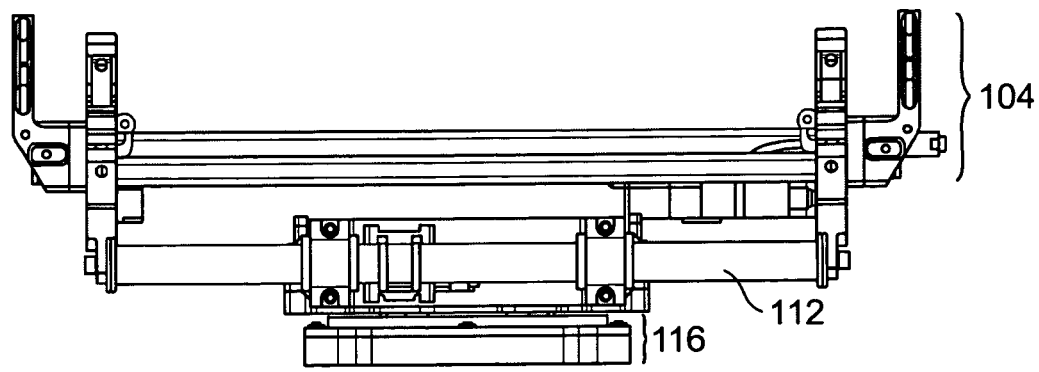
FIG. 5 is a front view of a seat base assembly, a tracking assembly and a tapered swivel assembly.
Figure 7:
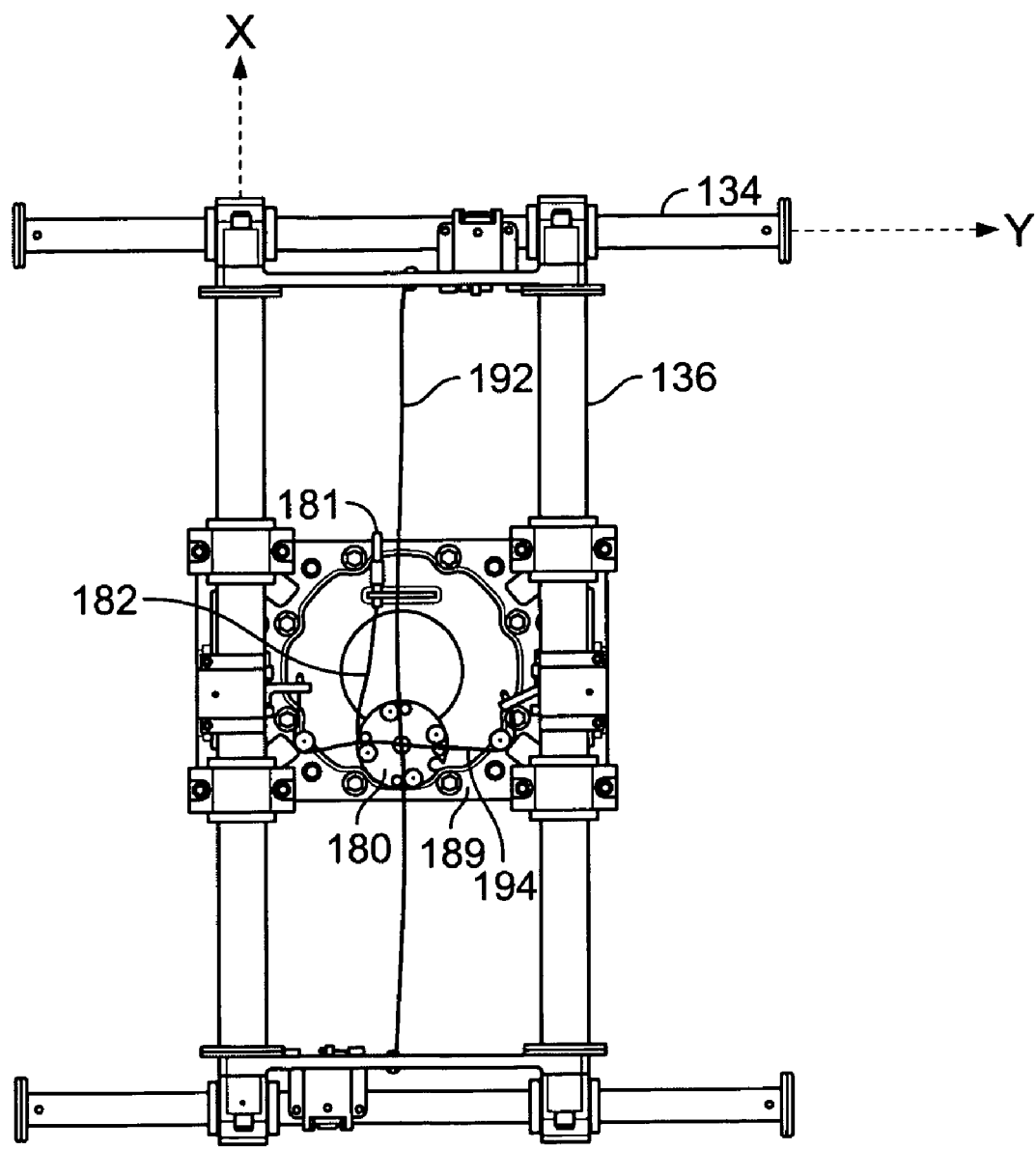
FIG. 7 is a top perspective view of a tracking assembly with a tracking plate and a cable tracking wheel.

FIG. 2 is a frontal schematic of the seat assembly 100 which illustrates the seat frame assembly 104 and its connection to the tracking assembly 112, which is operably connected to the tapered swivel assembly 116. In particular, sites 105 on the seat frame assembly are connected to mount sites 114 on the tracking assembly 112 by screws, rivets, or any other suitable attachment mechanism. As illustrated in FIG. 2, the tracking assembly 112 comprises two pairs of parallel rods; namely, a first set of parallel rods 134 and a second set of parallel rods 136, which enable the frame assembly, and the seat assembly 100 attached thereto to slide in the Y-axis and the X-axis direction, respectively, and as depicted in FIGS. 3 and 7. In particular, parallel rods 134 slide in the Y-axis direction through sleeves 158 mounted in brackets 154, which are attached to the ends of the second pair of parallel support rods 136. The second pair of support rods 136 slides in the X-axis direction through sleeves 142, which are mounted in the housing 140. The tapered swivel assembly 116 is connected to the base assembly 110 at mount sites 125 by screws, rivets, or any other suitable attachment mechanism.

The tapered swivel assembly 116 will now be described in more detail with reference to the FIGS.. As shown in FIGS. 9–18, the tapered swivel assembly 116 creates an angled bearing that is substantially self-centering and enables the seat to tend towards the middle of its axis of rotation, without the need for a high molecular weight-bearing around the edges. The tapered swivel assembly 116 absorbs much of the force associated with weight-shifting in the seat, arising from lateral and/or rotational movement of the seat assembly 100, and/or by an occupant's own movements, all of which may cause forces on the tapered swivel assembly 116. In particular, the components of the tapered swivel assembly 116 (described in detail below) remain laterally immobile or at least substantially laterally immobile with respect to each other despite (and in response to) changes in force from the seat assembly 100, including from any shift in the center of gravity and/or weight changes or shifts arising from changes in the configuration or orientation of the seat assembly 100 caused by lateral and/or rotational movement of the seat assembly 100, and/or by an occupant's own movements in the seat assembly 100. The tapered swivel bearing 164, for example, remains in a central or substantially central (i.e., concentric or substantially concentric) alignment atop, and with respect to, the bottom swivel plate 165. The lack of lateral movement and shifting of the components of the tapered swivel assembly 116 in relation to one another is based in the complementary tapered configurations of the components (discussed below). This lateral immobility of the components of the tapered swivel assembly 116 not only increases the comfort, durability and ease of use of the seat assembly 100 but also reduces the costs associated with production of the tapered swivel assembly 116.

Figure 9:
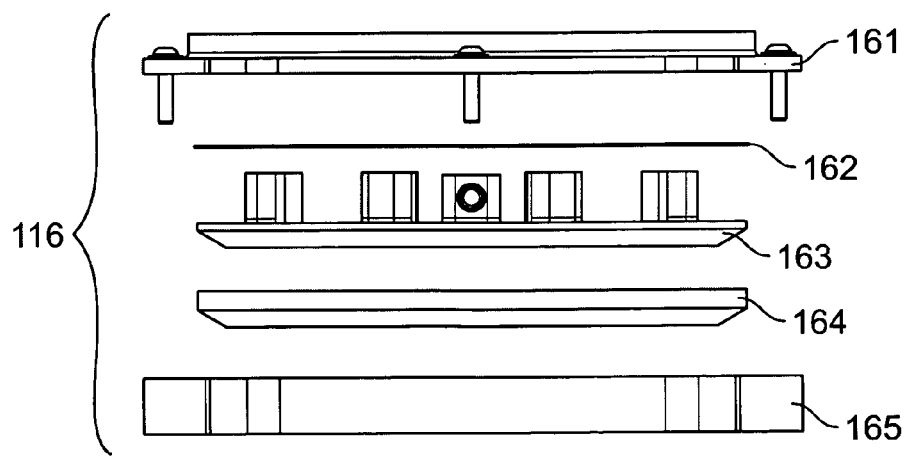
FIG. 9 is an exploded perspective view of the tapered swivel assembly shown in FIG. 4, showing a top locking ring, a composite strip, a top swivel plate, a tapered swivel bearing, and a bottom swivel plate.
Figure 10:
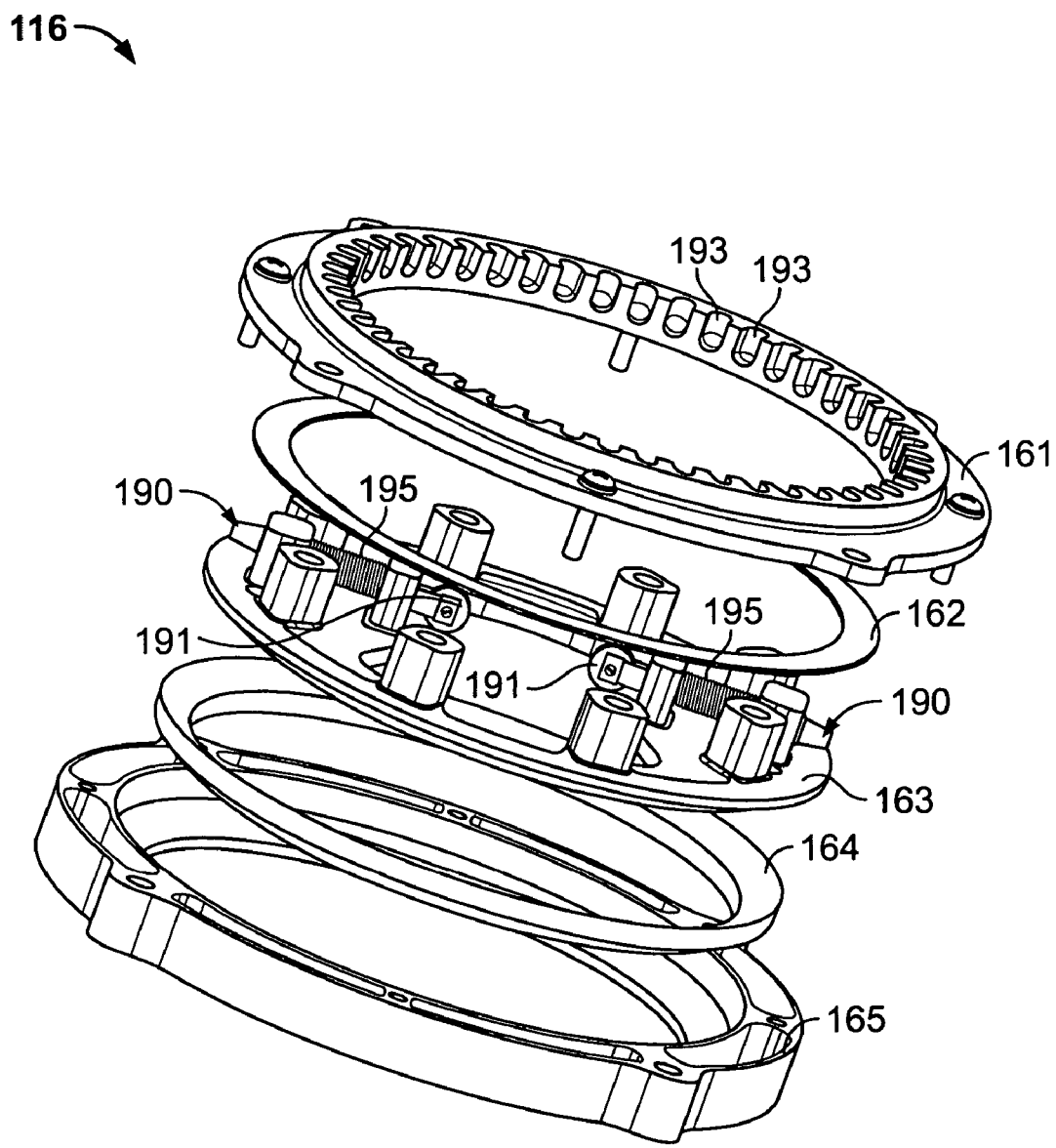
FIG. 10 is an exploded perspective view of the tapered swivel assembly shown in FIG. 4.
Figure 11:
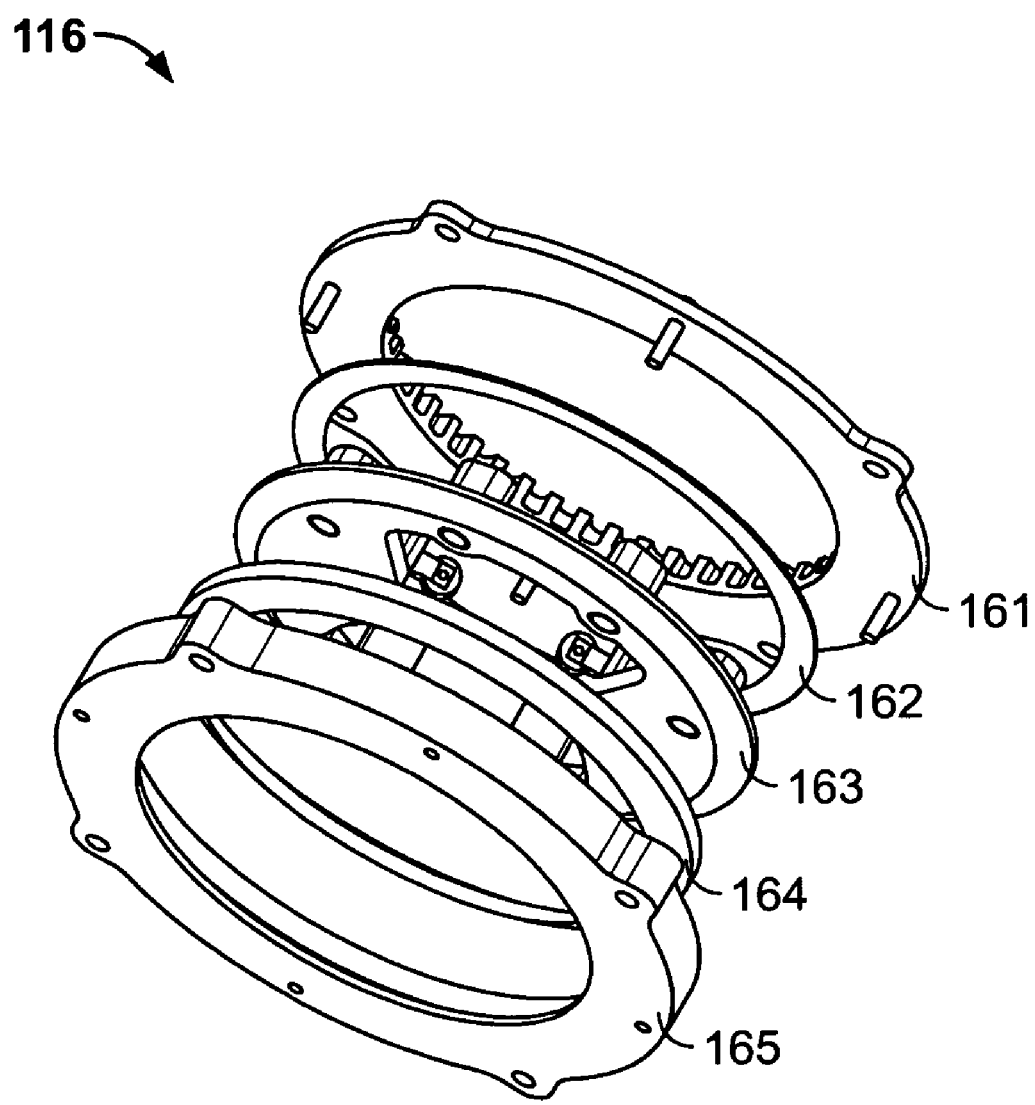
FIG. 11 is another exploded perspective view of the tapered swivel assembly shown in FIG. 4.
Figure 12:
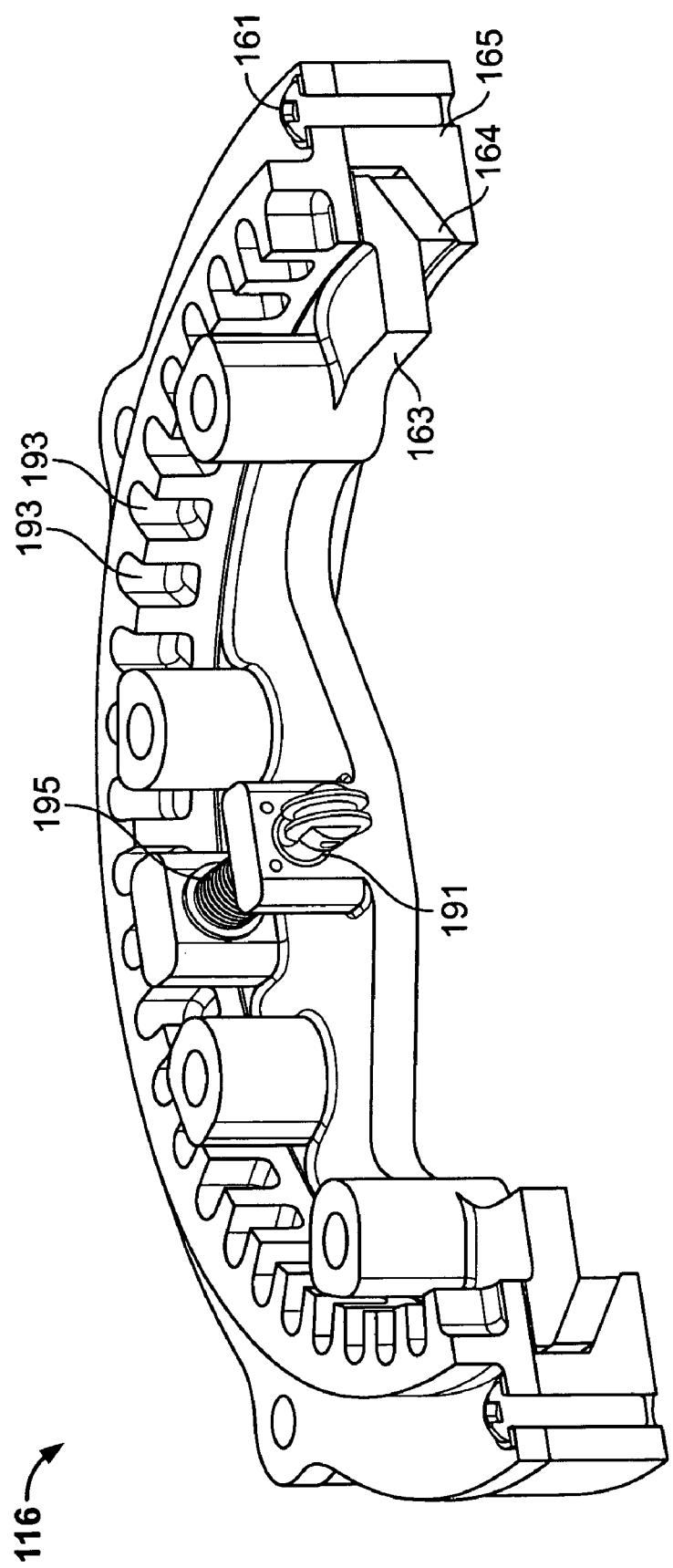
FIG. 12 is an interior cross-sectional view of the tapered swivel assembly shown in FIG. 4.
Figure 13:
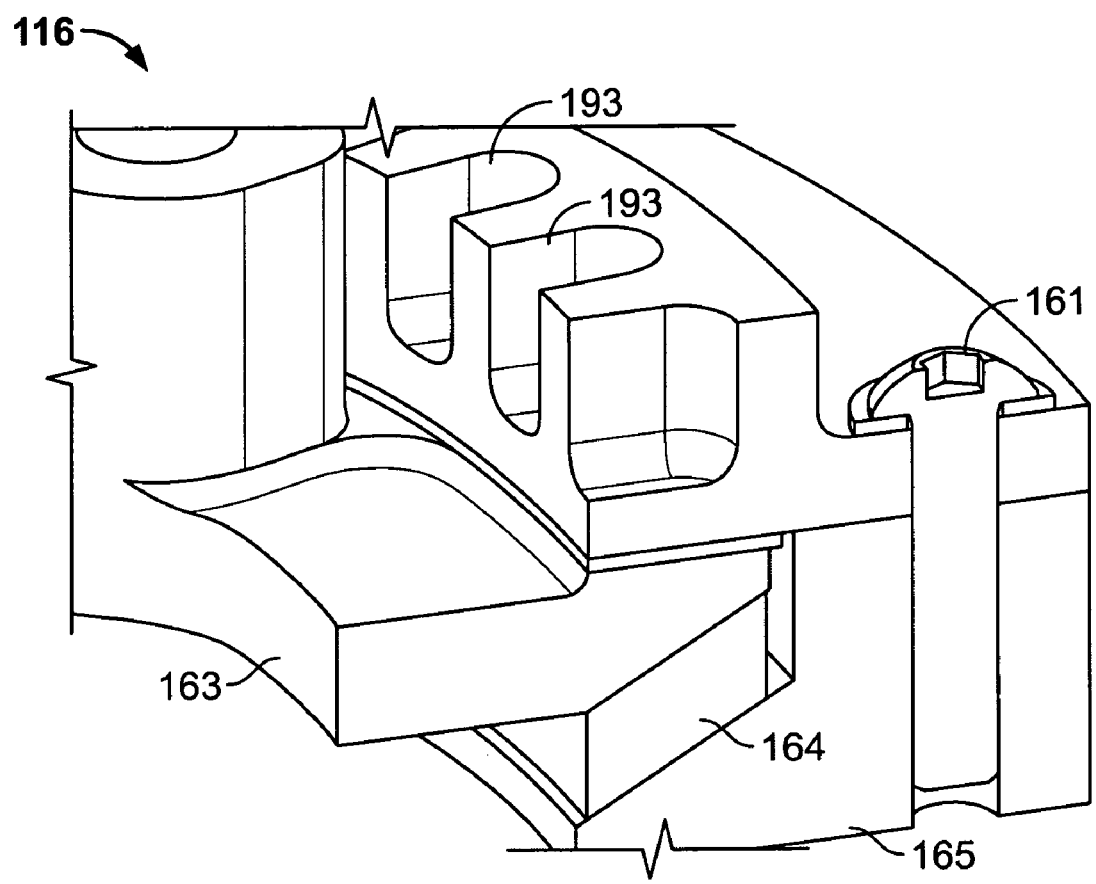
FIG. 13 is a detailed interior cross-sectional view of the tapered swivel assembly shown in FIG. 4.
Figure 14:
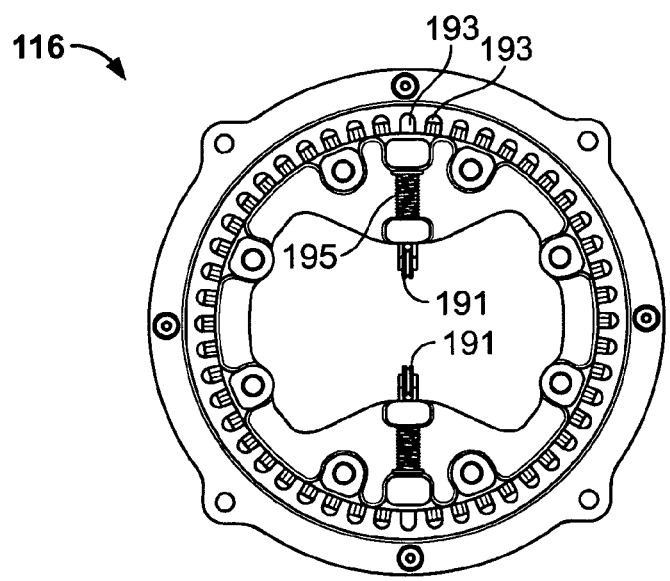
FIG. 14 is a top view of the tapered swivel assembly shown in FIG. 4.
Figure 15:
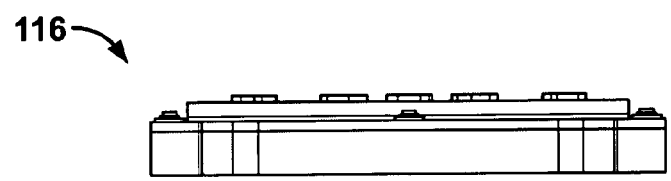
FIG. 15 is a side view of the tapered swivel assembly shown in FIG. 4.
Figure 16:
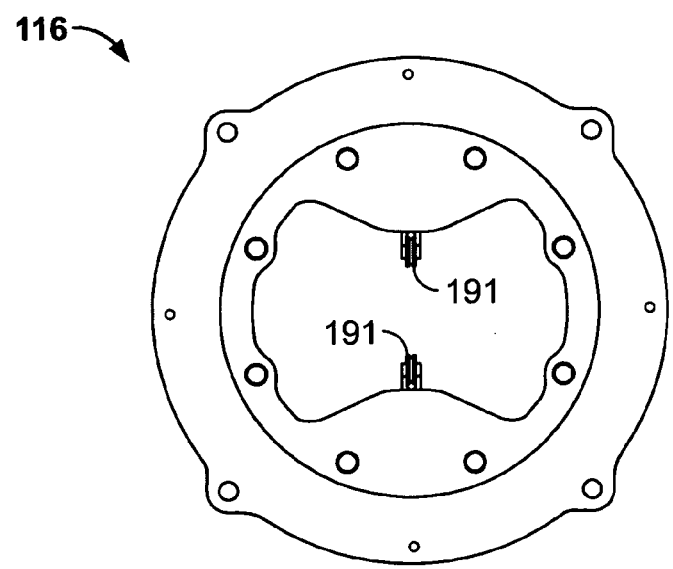
FIG. 16 is a bottom view of the tapered swivel assembly shown in FIG. 4.
Figure 17:
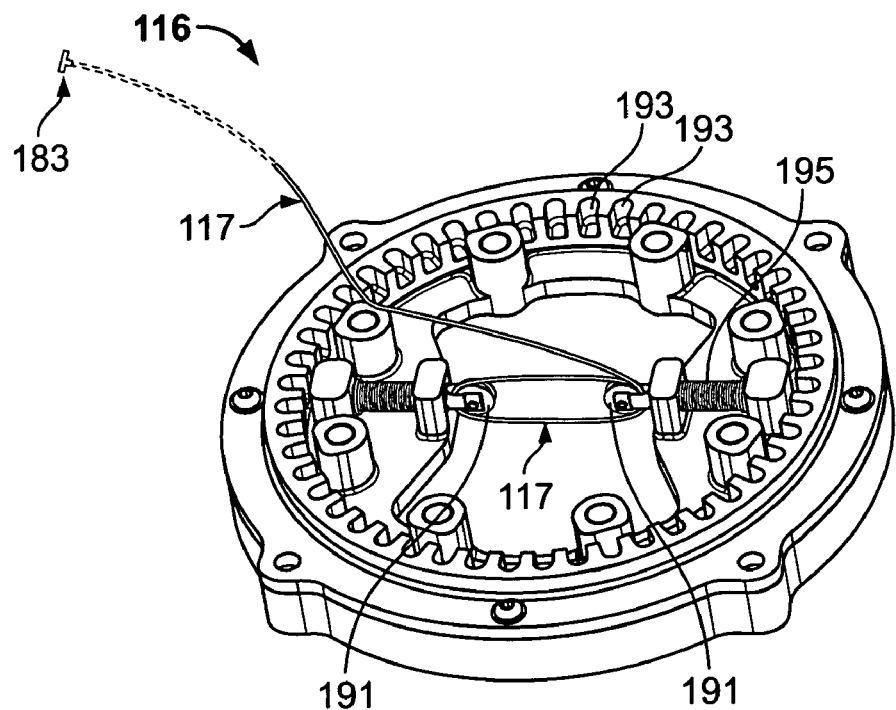
FIG. 17 is top perspective view of the tapered swivel assembly shown in FIG. 4.
Figure 18:
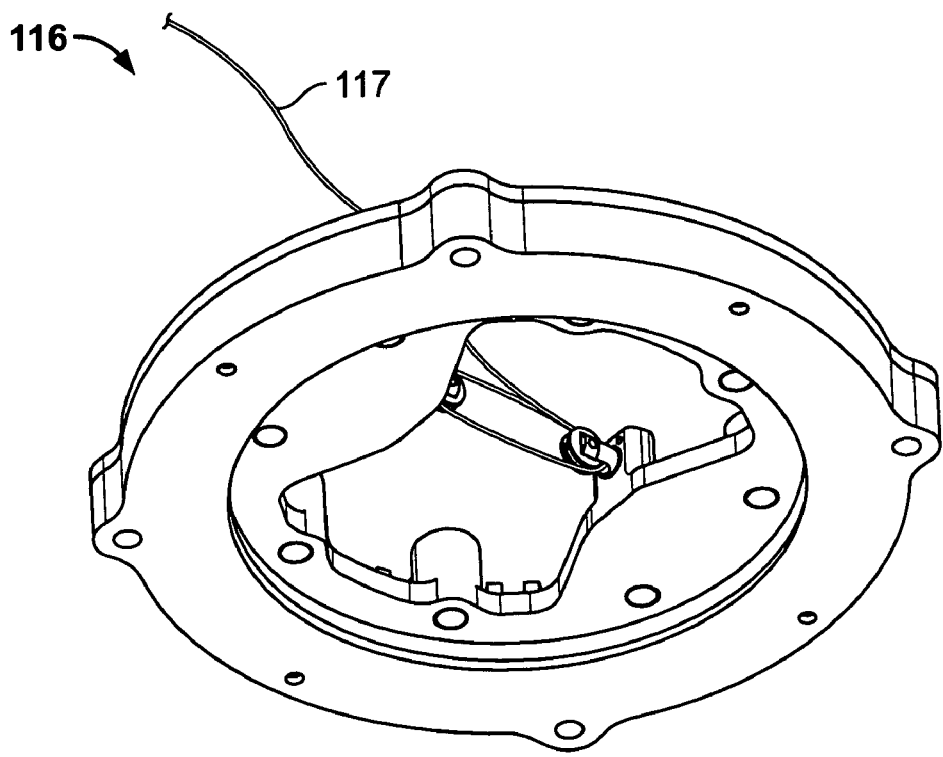
FIG. 18 is a bottom perspective view of the tapered swivel assembly shown in FIG. 4.

The tapered swivel assembly 116 is illustrated more clearly in FIGS. 9–17. In particular, as illustrated in FIGS. 9–11, the tapered swivel assembly 116 comprises a locking ring 161, a composite strip 162, a top swivel plate 163, a tapered swivel bearing 164, and a bottom swivel plate 165. The tapered swivel bearing 164 can be made out of any suitable material. For example, the tapered swivel bearing 164 can be a manufactured bearing, e.g., from INA USA Corp. (Fort Mill, S.C.), part no. AXFS-236411. Moreover, the tapered swivel bearing 164 can be any other suitable steel alloy or aluminum alloy bearing. The locking ring 161 of the tapered swivel assembly 116 has a series of grooves 193 around its interior peripheral edge, best seen in FIGS. 10–13 and 17. Moreover, as depicted most clearly in FIG. 10, the series of grooves 193 of the locking ring 161 accepts two or more locking pins 190 that are retractably connected atop the top swivel plate 163 to two or more springs 195 and to two or more pulley wheels 191. Cable 117 extends around the two or more pulley wheels 191, as depicted in FIGS. 17–18, and to a releasing trigger 183 (visible in FIGS. 17 and 20) located at any suitable site on the seat assembly 100 that is easily reachable by an occupant (e.g., on the arm rest). When the releasing trigger 183 is deployed by an occupant, cable 117 is shortened and pulls the two or more pulley wheels 191, which pull the two or more locking pins 190 into a "retracted" position outside of the grooves 193 of the locking ring 161, such that the seat assembly 100 is free to rotate. When at rest, the two or more locking pins 190 are extended into grooves 193 of the locking ring 161, such that the tapered swivel assembly 116 prevents rotation of the seat assembly 100. In another embodiment of the present invention, the cable 117 is operably connected to the cable tracking wheel 180, such that actuation of the cable tracking wheel 180 (as discussed below) causes a shortening of cable 117, which pulls the two or more locking pins 190 out of grooves 193.

It is preferable that the two or more locking pins 190, the two or more springs 195 and the two or more pulley wheels 191 are mounted within the tapered swivel assembly 116, and more particularly, atop the top swivel plate 163. Conventional seat assemblies, on the other hand, typically have locking pins that are mounted on the bottom side of a tracking plate (See, e.g., U.S. Pat. No. 5,161,765 referenced above). This conventional configuration is troublesome, because any bending or raising up of the tracking plate relative to the swivel assembly, during operation of the conventional seat, can cause the locking pins to disengage from the grooves of a locking plate, thereby resulting in an inability to control rotational movement of the seat assembly. This problem is prevented by mounting the locking pins 190 to the top swivel plate 163, in the context of the present invention. Moreover, the top swivel plate 163 and the bottom swivel plate 165 are preferably anchored or connected to different components of the seat assembly 100. More preferably, the top swivel plate 163 is connected to the tracking plate 189 of the tracking assembly 112 and the bottom swivel plate 165 is connected to the leg base assembly 118, as shown in FIG. 3.

The ability of the components of the tapered swivel assembly 116 to be laterally or substantially laterally immobile despite, or in response to, forces upon it by the seat assembly 100 is based on the "tapered" configuration of the component parts. In particular, as depicted most clearly in FIGS. 12–13, the top swivel plate 163, the tapered swivel bearing 164 and the bottom swivel plate 165 have complementary configurations which are tapered (i.e., dish—like or conical) in structure or shape, thus allowing these components of the tapered swivel assembly 116 to fit together in a "cradled" position, and preventing lateral movement of the components in relation to one another. Lateral shifting of the tapered swivel bearing 164, for example, does not occur, due to the fact that the resultant upward shift of the tapered swivel bearing 164 is prevented by the top swivel plate 163.

Figure 8:
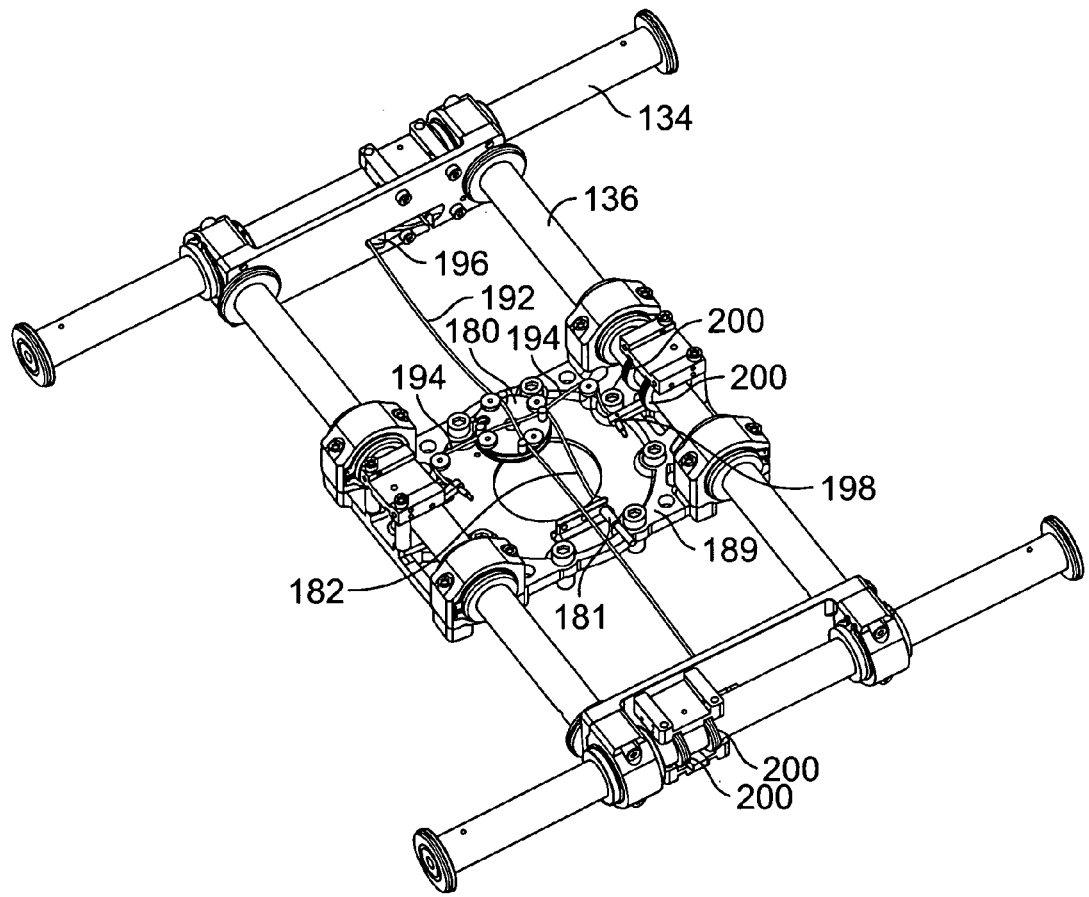
FIG. 8 is a top perspective view of a tracking assembly with a tracking plate and a cable tracking wheel.

The cable tracking wheel 180 will now be described in more detail with reference to the FIGS. The cable tracking wheel 180 functions to localize the control points for lateral movement of the seat assembly 100 at one site, thus minimizing the complexity of the design and operation of the seat assembly 100 along the Y-axis and the X-axis, and maximizing the ease of use. In particular, as shown in FIG. 8, the cable tracking wheel 180 connects all ring brakes 200 and 202, which, at rest, prevent lateral movement of the seat assembly 100, along the Y-axis and the X-axis to a releasing cable 182 that is controllable or operable by the occupant of the seat assembly 100, through use of a releasing trigger 183, discussed above. This use of ring brakes 200 and 202 to slidably encircle parallel rods and the use of levers or cam members to control the ring brakes is well-known in the art, as disclosed, e.g, in U.S. Pat. No. 5,161,765. In another embodiment of the present invention, the cable tracking wheel 180 connects both the ring brakes 200 and 202 and the two or more locking pins 190 (discussed above) and, therefore, is capable of controlling all lateral and rotational movement of the seat assembly 100.

Figure 19:
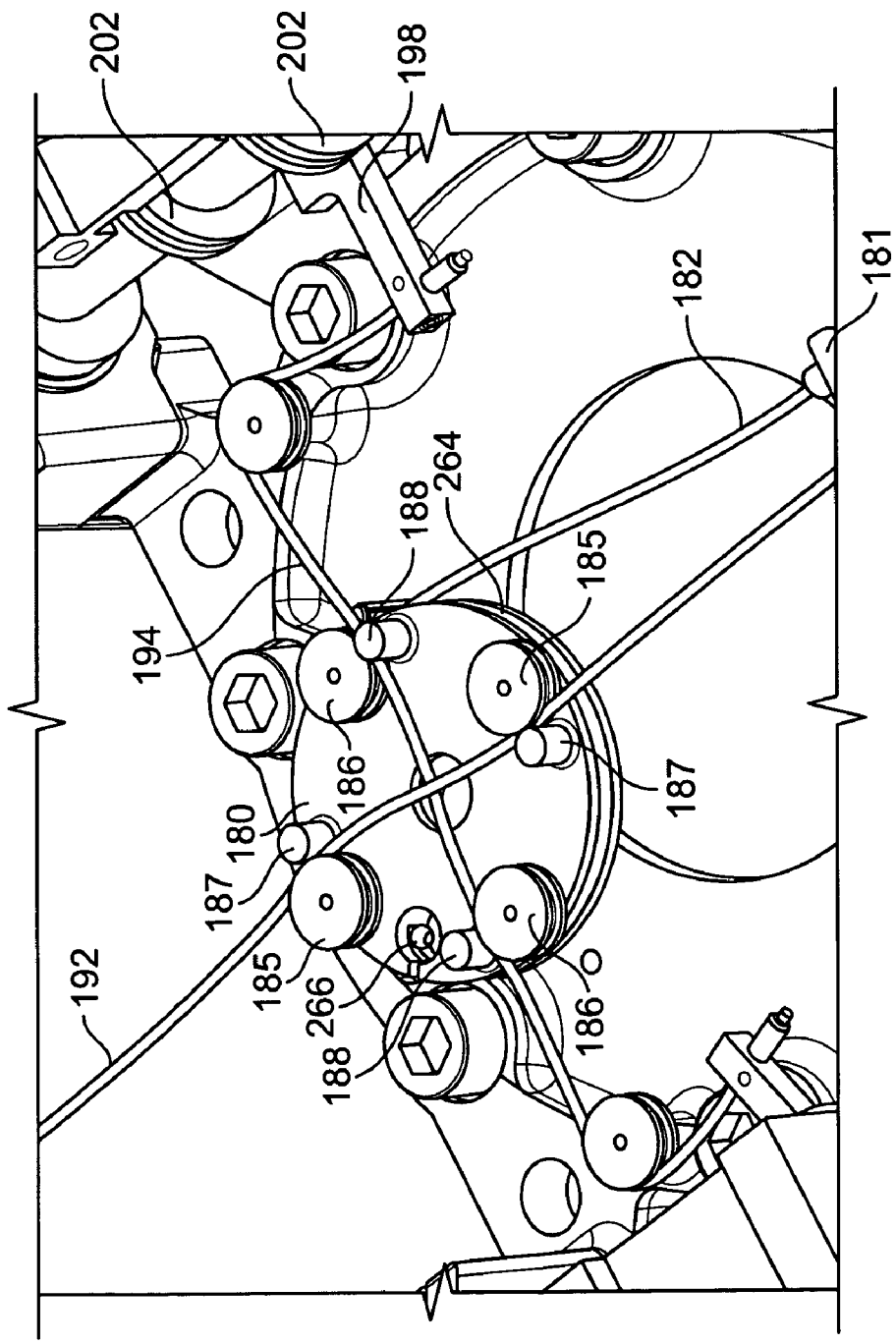
FIG. 19 is a top perspective view of a cable tracking wheel attached atop a tracking plate.
Figure 20:
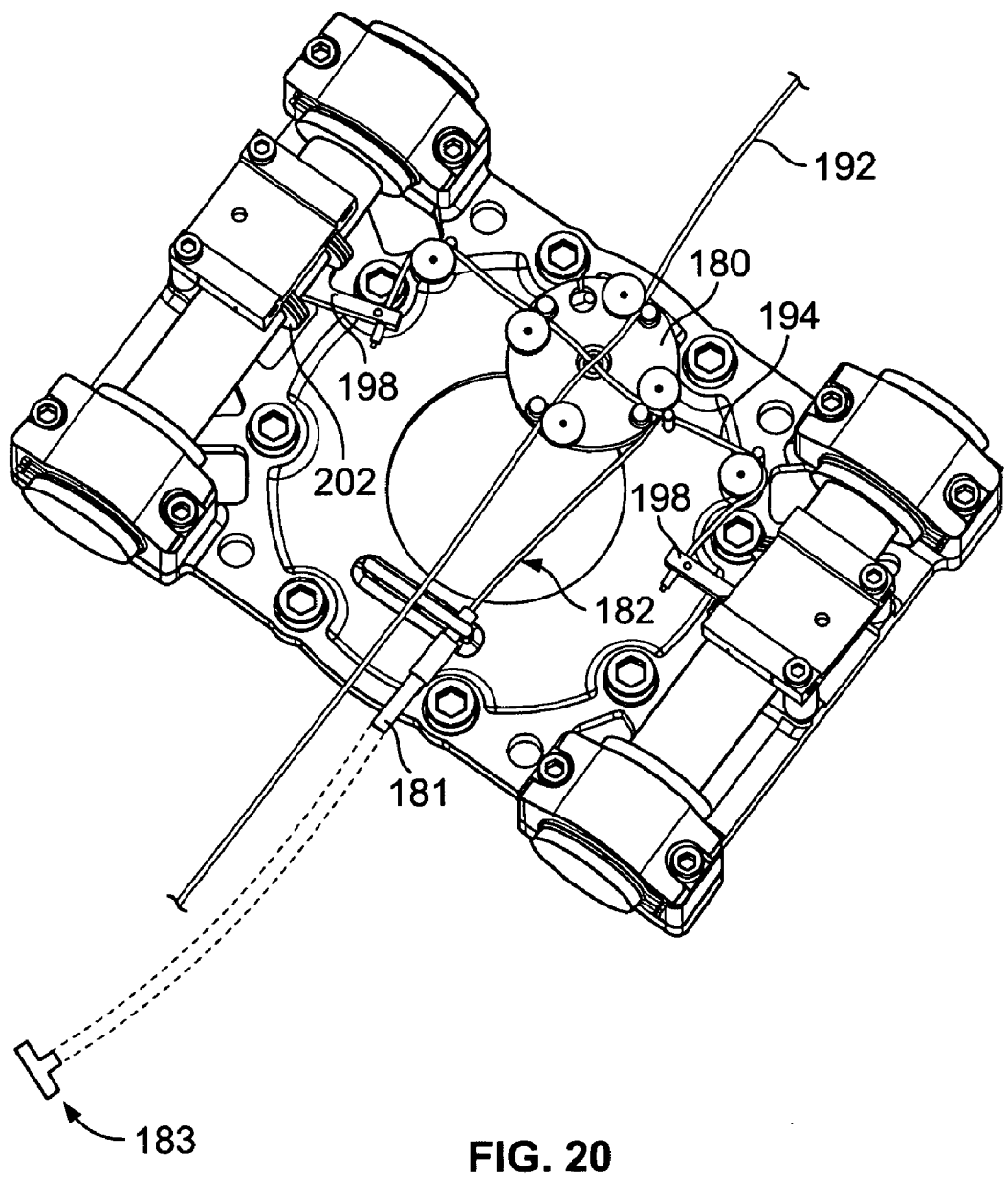
FIG. 20 is a top perspective view of a cable tracking wheel attached atop a tracking plate.
Figure 21:
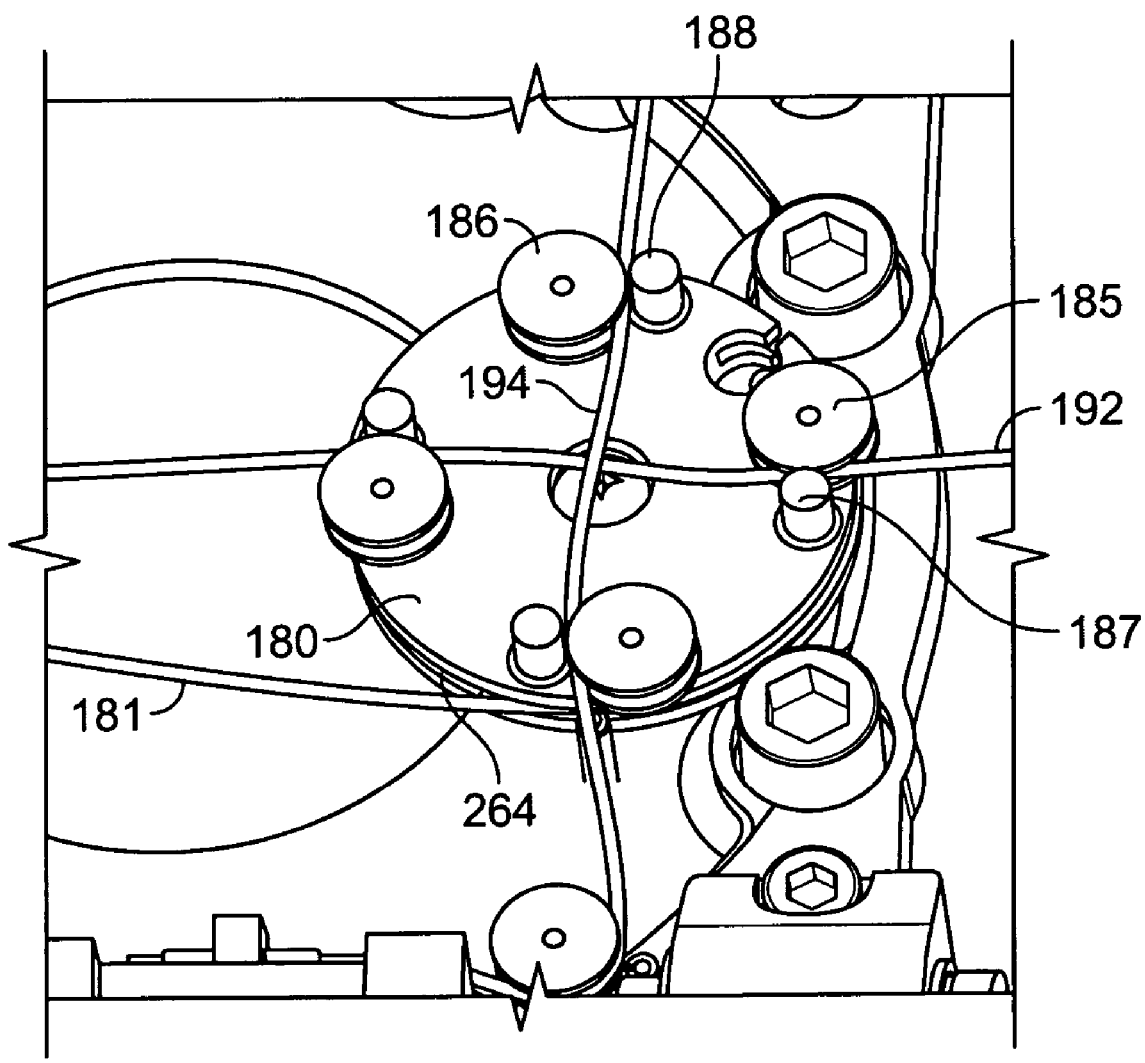
FIG. 21 is a top perspective view of a cable tracking wheel attached atop a tracking plate.
Figure 22:
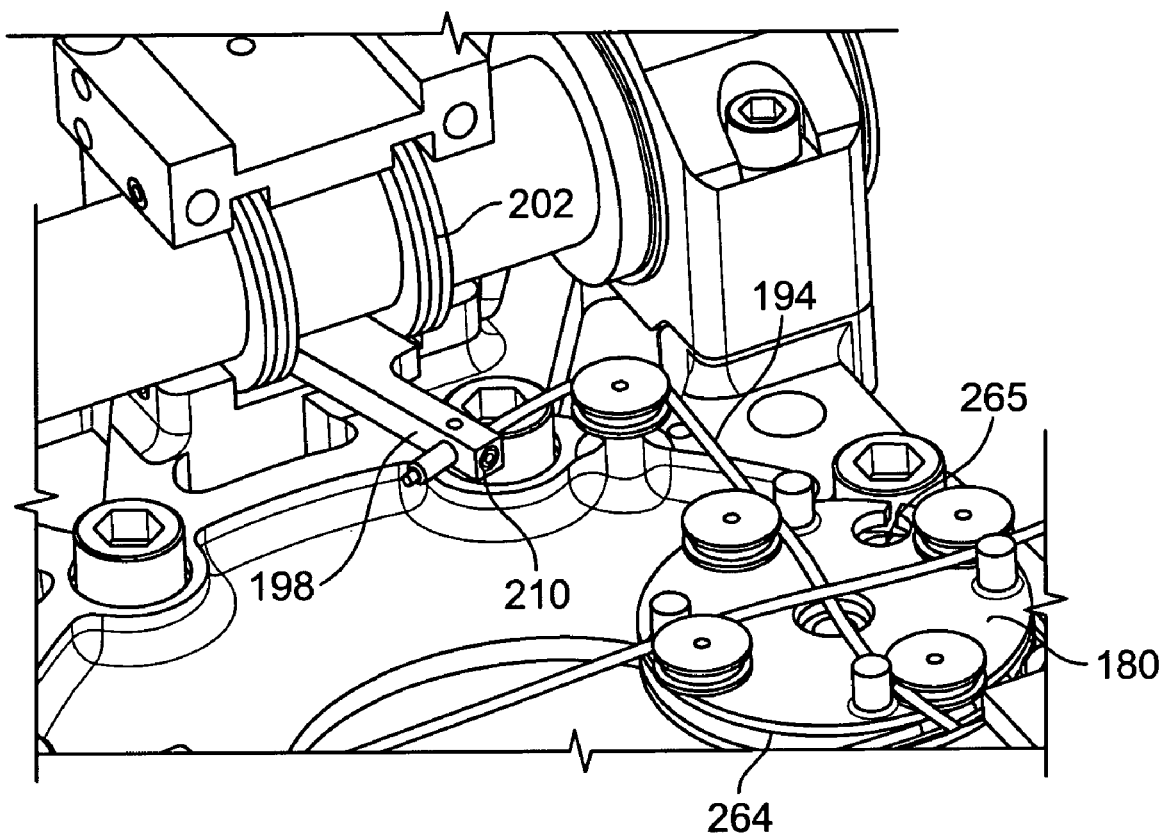
FIG. 22 is a top perspective view of a cable tracking wheel, as connected to a lever and ring brakes.
Figure 23:
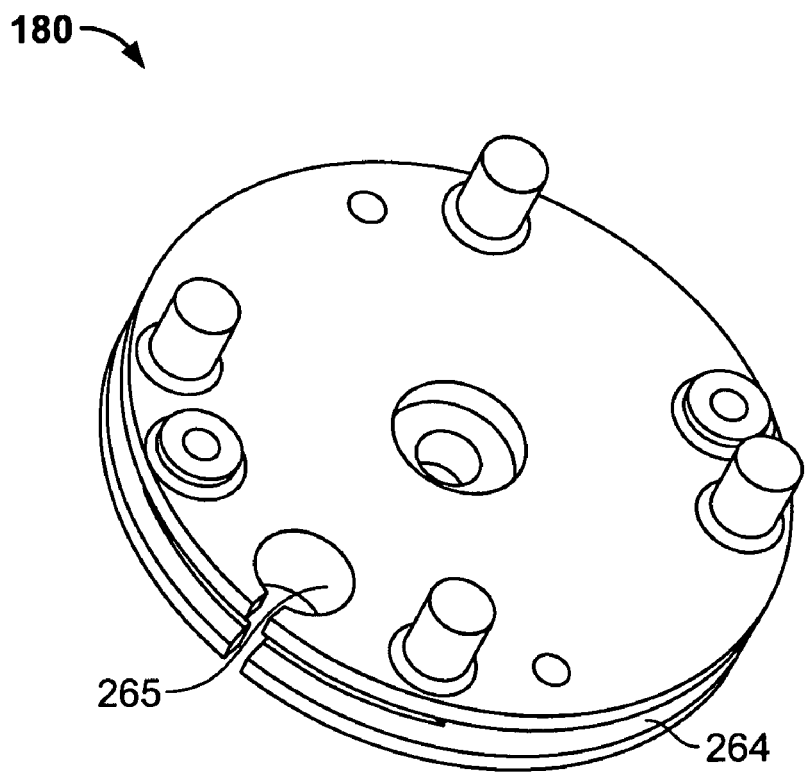
FIG. 23 is a top perspective view of a cable tracking wheel.
Figure 24:
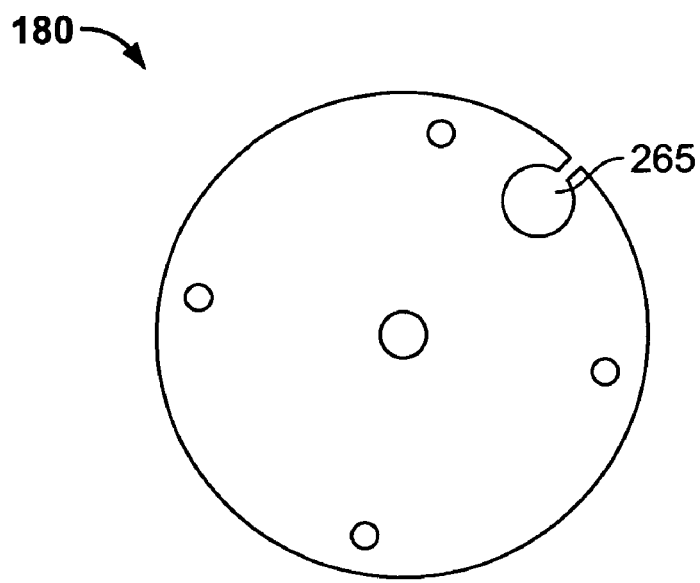
FIG. 24 is a bottom view of a cable tracking wheel.

FIGS. 7–8 and 19–22 depict the top view of the cable tracking wheel 180 atop the tracking plate 189, together with cables 192 and 194, which are operably connected to the cable tracking wheel 180. Cables 192 and 194, as depicted in FIG. 8, are operably connected to levers 196 and 198, respectively, which are operably connected to ring brakes 200 and 202, respectively, which are situated on the first set of parallel rods 134 and on the second set of parallel rods 136, respectively. In this regard, FIGS. 19–20 and 22 depict more closely the connections between cable 194, lever 198, and ring brakes 202. As depicted in FIG. 22, cable 194 is connected to lever 198 through use of a locking set screw 210. In this regard, while FIG. 22 reveals a crimping of cable 194, no crimping of the cable is necessary in the context of the present invention; rather, the use of a locking set screw 210 results in greater adjustability of the device, due to the fact that the locking set screw 210 requires less space within seat assembly 100, e.g., such that extra space is available for attachment of electric actuators. FIGS. 7–8 and 19–21 (and particularly FIGS. 19 and 20) also depict a single origination point 181 on the cable tracking wheel 180 from which a releasing cable 182 extends to a releasing trigger 183 (not visible in the FIGS.). As depicted in FIG. 19, the releasing cable 182 extends from the orientation point 181 of the cable tracking wheel, via a groove 264 (see also FIGS. 23 and 26) on the peripheral side edge of the cable tracking wheel 180 and is secured, e.g., by a ball 266 on the end of the cable at site 265 (which is clearly depicted in FIGS. 22–25). In this regard, the ball 266 can be held in the groove 264 by any suitable manner, e.g., by a pin that forms a slot with the side of the groove that is smaller than the ball. In this regard, a pulling of the releasing cable 182 of seat assembly 100 causes the cable tracking wheel 180 to turn in a clockwise or counter-clockwise direction.

Figure 25:
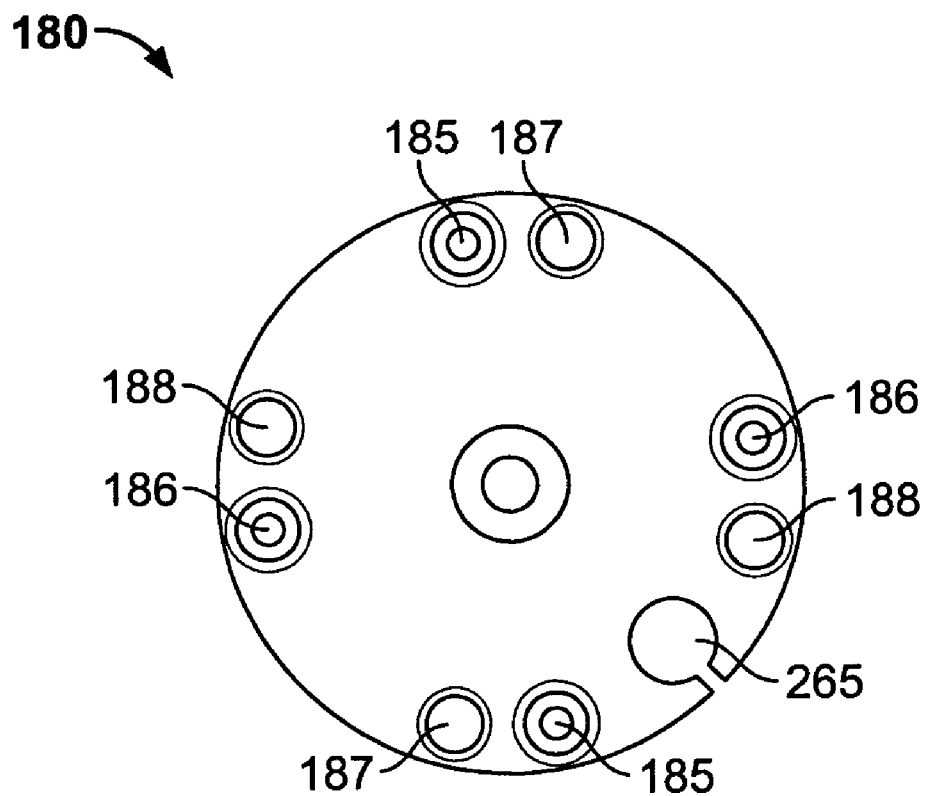
FIG. 25 is a top view of a cable tracking wheel.
Figure 26:
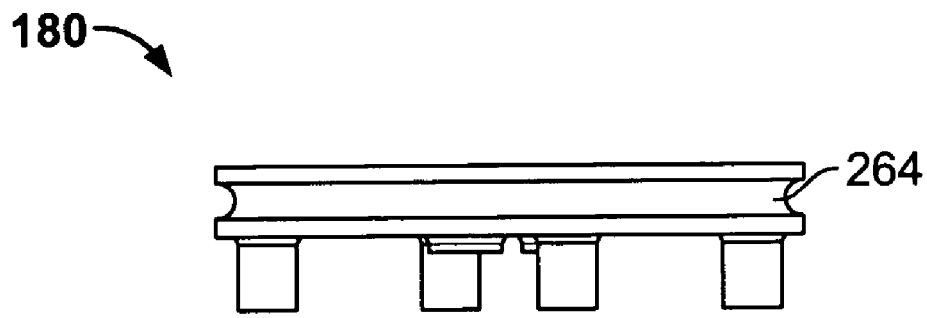
FIG. 26 is a side view of a cable tracking wheel.

FIGS. 19, 21 and 25 provide a closer depiction of the cable tracking wheel 180. As illustrated in these FIGS., the cable tracking wheel 180 comprises two sets of rotatably-mounted pulley wheels 185 and 186 on its surface, as well as two sets of proximately-located leverage posts 187 and 188. Each set of pulley wheels 185 and 186 forms an operable unit with the leverage posts 187 and 188, through which either cable 192 or 194 passes and is held securely. In particular, pulley wheels 185 and leverage posts 187 guide cable 192 across the cable tracking wheel 180, while pulley wheels 186 and leverage posts 188 guide cable 194 across the cable tracking wheel 180. In a preferred embodiment cables 192 and 194 are held in substantially straight line orientations across the cable tracking wheel 180 when the cable tracking wheel is at rest (i.e., not deployed by the releasing trigger 183). Such a straight line orientation of the cables 192 and 194 across the tracking wheel cable mechanism is preferable, in that energy is conserved, space is maximized and unnecessary complexity is avoided. In other words, the cables traveling between the opposing levers of the two sets of parallel rods cross each other substantially near the center of the cable tracking wheel 180. This configuration, in fact, is illustrated in FIGS. 7–8 and 19–22. In another embodiment of the present invention, the two or more cables 117 are connected to the top, side or bottom of the cable tracking wheel 190 and extend from the cable tracking wheel 180 to the tapered swivel assembly 116 around the two or more pulley wheels 191, which are operably connected to the two or more locking pins 190 of the tapered swivel assembly 116.

Operation of the moveable seat described in the pending application preferably occurs as follows: an occupant deploys the releasing trigger 183 and both cable 117 and releasing cable 182 are pulled. Releasing cable 182 actuates or pulls the cable tracking wheel 180 in a clockwise or counterclockwise direction, such that the cables 192 and 194, which are operably connected to the cable tracking wheel 180 and the levers 196 and 198 operably connected to the ring brakes 200 and 202 are pulled and shortened by the rotating cable tracking wheel, thereby causing a releasing of the two sets of parallel rods 134 and 136 for substantially frictionless motion through sleeves 158 and 142. Concurrently, cable 117 pulls pulley wheels 191, which pull locking pins 190 into a "retracted" position against springs 195. Accordingly, the occupant of the seat assembly 100, by manipulating the releasing trigger 183, can adjust both the lateral (i.e., along the X-axis and the Y-axis) and rotational position of the seat assembly 100. In this manner, the seat assembly 100 is highly adjustable with regards to its position.

The moveable seat of the present invention may also include any suitable headrest, such as an adjustable headrest, the operation of which may be controlled by the cable tracking wheel 180. Moreover, the moveable seat of the present invention may comprise any suitable leg rest, or more preferably an adjustable leg rest (e.g., an extending leg rest), the operation of which may be controlled by the cable tracking wheel 180. Moreover, the moveable seat of the present invention may comprise any other moveable parts, commonly known in the art, the movement of which may be operably connected to the cable tracking wheel 180.

The use of the terms "a," "an," "the," and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A moveable seat, comprising:
   a seat frame assembly;
   a tracking assembly comprising moveable parts that move the seat frame assembly, and a cable tracking wheel capable of controlling movement of the tracking assembly; and
   a tapered swivel assembly having components that are substantially laterally immobile with respect to each other, despite forces from the seat frame assembly upon the tapered swivel assembly, wherein the cable tracking wheel is operably connected to at least one locking pin of the tapered swivel assembly for selectively controlling rotation of the seat frame assembly.

2. The moveable seat of claim 1, wherein the cable tracking wheel is operably connected to ring brakes of the tracking assembly which control releasing of the movable parts for lateral movement of the seat frame assembly.

3. The moveable seat of claim 2 further comprising at least one cable connecting the cable tracking wheel with said ring brakes.

4. The moveable seat of claim 3 wherein said at least one cable comprises a first cable extending across the cable tracking wheel and a second cable extending across the first cable and being generally perpendicular to the first cable.

5. The moveable seat of claim 1, wherein the laterally immobile components of the tapered swivel assembly comprise:
   a top swivel plate
   a tapered swivel bearing,
   a bottom swivel plate, and
   a locking ring.

6. The moveable seat of claim 5 wherein said at least one locking pin is configured on the top swivel plate and the locking ring is generally annular with an inner circumference including a plurality of grooves configured for receiving said at least one locking pin.

7. The moveable seat of claim 6 wherein said at least one locking pin comprises a spring for urging said at least one locking pin into the plurality of grooves.

8. The moveable seat of claim 1 further comprising a cable connecting the cable tracking wheel with said at least one locking pin for retracting said at least one locking pin to allow rotation of the seat frame assembly.

9. A moveable seat comprising:
   a fixed base for mounting the moveable seat to a surface;
   a seat assembly including a seatback portion and a seatbase portion;
   a tracking assembly for moving the seat assembly laterally in a horizontal plane above the fixed base, the tracking assembly including a tracking plate connected to the seatbase portion and a cable tracking wheel rotatably mounted on the tracking plate;
   a swivel assembly for rotating the seat assembly above the fixed base, the swivel assembly including a generally annular lock ring with an inner circumference including a plurality of grooves, a top swivel plate connected to the tracking assembly and including at least one locking pin normally biased to engage the plurality of grooves, a bottom swivel plate connected to the fixed base, and a tapered swivel bearing sandwiched between the top and bottom swivel plates; and
   a release mechanism coupled with the tracking assembly and the swivel assembly for controlling rotation and lateral movement of the seat assembly.

10. The moveable seat of claim 9 wherein the release mechanism is coupled to at least one of said at least one locking pin and said cable tracking wheel.

11. The moveable seat of claim 10 wherein the release mechanism comprises a cable extending from said at least one locking pin to said cable tracking wheel for substantially simultaneously enabling rotation and lateral movement of the seat assembly.

12. The moveable seat of claim 9 wherein the release mechanism comprises a cable coupled to said at least one locking pin for retracting said at least one locking pin from said plurality of grooves.

13. The moveable seat of claim 9 wherein the tracking assembly further comprises ring brakes coupled with the cable tracking wheel.

14. The moveable seat of claim 13 wherein the tracking assembly further comprises at least one cable connecting the ring brakes to the cable tracking wheel.

15. The moveable seat of claim 14 wherein the release mechanism is coupled to the cable tracking wheel for rotating said cable tracking wheel to reduce a length of the cable thereby releasing the ring brakes.

16. An apparatus for laterally moving and rotating a seat frame assembly of a seat having a base mounted to a surface, the apparatus comprising:
   a tracking assembly including a tracking plate configured for connection to a horizontal portion of the seat frame assembly, and a cable tracking wheel rotatably mounted on the tracking plate;
   a swivel assembly for rotating the seat frame assembly, the swivel assembly including a generally annular lock ring with an inner circumference including a plurality of grooves, a bottom swivel plate configured for connection to the base and to the generally annular lock ring, a top swivel plate connected to the tracking assembly and including at least one locking pin normally biased to engage the plurality of grooves, and a tapered swivel bearing sandwiched between the top and bottom swivel plates; and
   a release mechanism coupled with the tracking assembly and the swivel assembly for selectively controlling rotation and lateral movement of the seat frame assembly.

17. The apparatus of claim 16 wherein the release mechanism is coupled to at least one of said at least one locking pin and said cable tracking wheel.

18. The apparatus of claim 17 wherein the release mechanism comprises a cable extending from said at least one locking pin to said cable tracking wheel, the cable configured for substantially simultaneously retracting said at least one locking pin from said plurality of grooves and rotating said cable tracking wheel.

19. The apparatus of claim 16 wherein the tracking assembly further comprises:
   ring brakes; and
   at least one cable coupled with the ring brakes and the cable tracking wheel.

20. The apparatus of claim 19 wherein the release mechanism is connected with the cable tracking wheel for rotating said cable tracking wheel, wherein reducing a length of said at least one cable releases the ring brakes.

* * * * *